(12) United States Patent
Flynn et al.

(10) Patent No.: US 8,356,390 B2
(45) Date of Patent: Jan. 22, 2013

(54) COUPLING CLAMPING SYSTEM

(75) Inventors: William T. Flynn, Horton, MI (US); Jason C. Gauss, Jackson, MI (US)

(73) Assignee: Eaton Corporation, Cleveland, OH (US)

( * ) Notice: Subject to any disclaimer, the term of this patent is extended or adjusted under 35 U.S.C. 154(b) by 260 days.

(21) Appl. No.: 12/639,687

(22) Filed: Dec. 16, 2009

(65) Prior Publication Data

US 2011/0140415 A1   Jun. 16, 2011

(51) Int. Cl.
    *A44B 17/00*   (2006.01)
(52) U.S. Cl. ............................................ 24/270; 24/273
(58) Field of Classification Search .................. 285/82, 285/252, 309–312; 24/270, 273, 20 CW, 24/70 SK
    See application file for complete search history.

(56) References Cited

U.S. PATENT DOCUMENTS

| | | | |
|---|---|---|---|
| 996,478 A * | 6/1911 | Francis ............................ | 24/270 |
| 3,520,563 A * | 7/1970 | Decker, Jr. ....................... | 285/87 |
| 4,008,937 A | 2/1977 | Filippi | |
| 4,249,786 A | 2/1981 | Mahoff | |
| 4,660,870 A * | 4/1987 | Donley ............................. | 285/419 |
| 4,881,760 A | 11/1989 | Runkles et al. | |
| 4,900,070 A | 2/1990 | Runkles et al. | |
| 4,924,913 A | 5/1990 | Pedersen | |
| 4,969,923 A | 11/1990 | Reeder et al. | |
| 5,188,400 A | 2/1993 | Riley et al. | |
| 5,530,997 A * | 7/1996 | Tessari ......................... | 24/68 SK |
| 5,620,210 A | 4/1997 | Eyster et al. | |
| 6,880,859 B2 | 4/2005 | Breay et al. | |
| 6,971,682 B2 | 12/2005 | Hoang et al. | |
| 2008/0083093 A1* | 4/2008 | Saltenberger et al. .... | 24/20 CW |

* cited by examiner

*Primary Examiner* — James Hewitt
(74) *Attorney, Agent, or Firm* — Rader, Fishman & Grauer PLLC

(57) ABSTRACT

A clamping system for use in a fluid coupling assembly may include redundant locking features for connecting adjacent ends of fluid conduits such as aircraft fuel lines. The exemplary clamping system may make use of two draw latch mechanisms that each separately apply a spring loaded clamping force to a flex band assembly through corresponding draw springs which oppose one another. Thus, either latch mechanism may provide a draw latch function by providing a clamping force to the flex band assembly, which in turn holds the end flanges of the fluid conduits together, thereby providing a sealing connection to facilitate the transfer of a fluid there between. Using two opposed draw latch mechanisms provides for redundant clamping forces such that the failure of one of the mechanisms does not result in an inadvertent disconnection of the fluid conduits one from the other.

18 Claims, 11 Drawing Sheets

COUPLING CLAMPING SYSTEM

TECHNICAL FIELD

A disclosed clamping system and method relates to a fluid coupling assembly with a redundancy feature.

BACKGROUND ART

Because of space confinements within certain operational environments such as an aircraft, coupling clamping assemblies for interconnecting tubular fluid conduits are often located at places that are difficult to reach, to see and to service. Thus, it is desirable to have coupling latch assemblies that include coupling latch mechanisms that can be easily manipulated with one hand to promote operational control. In addition, because of the potential operational environment where a coupling assembly may be used, it may be advantageous to have a redundancy feature to minimize inadvertent leakage of the conduit coupling joint should one coupling latch mechanism become damaged or fail to be properly latched in the installation process.

The use of a single latch draw spring is known. Moreover, clamping systems for fluid conduits are known that utilize a single latching device to pull the ends of a circular clamp together to hold the opposing ends of conduits to seal the two together. For example, U.S. Pat. No. 4,008,937 issued to E. Filippi on Feb. 22, 1977, discloses a split coupling assembly having a toggle clamp which latches and tensions a rod retainer to provide a clamping force. U.S. Pat. No. 4,924,913 issued to N. Pedersen on May 15, 1990, discloses a tube coupling system for joining metal tubes using a split coupler having a spring locking member. These latching devices have only one means of attaching and drawing together one end of the clamp to a second end of the clamping system thereby securing an end of a first conduit to a second conduit. Some even provide for increased security by providing an intermediate stop on the retainer latch mechanism to prevent the inadvertent or sudden complete release of the retaining band and the joined fluid conduits.

There are also examples of coupling clamping systems having redundant retention systems. For example, U.S. Pat. No. 5,620,210 issued to T. Eyster et al. on Apr. 15, 1997, discloses a coupling assembly having redundant locking features using a pivotal locking member and a pair of locking tines. U.S. Pat. No. 4,900,070 issued to R. Runkles et al. on Feb. 13, 1990, discloses a coupling assembly having redundant locking features using laterally spaced locking tines. U.S. Pat. No. 4,881,760 issued to Runkles et al. on Nov. 21, 1989, discloses a coupling assembly having redundant locking features using laterally spaced locking tines which includes indicia for visually confirming the latch is properly engaged.

SUMMARY

An exemplary fluid conduit clamping system includes a one piece split flex band assembly which includes a flex band, which has two free ends. The illustrative conduit clamping system includes a flex band assembly, which circumferentially surrounds and retains two fluid conduit members one to the other at two flex band ends thereby limiting movement of said tubular members with respect to one other when a pair of opposed latch members each connected to a respective end of the flex band are activated thereby stretching two draw springs which apply a clamping force between the two free ends of the flex band. Each latch member has a draw spring attached thereto which is free to swing so as to engage the latch member on the opposite end of the flex band. One spring is attached to a first free end and a second spring is attached to a second free end. The opposite end section of the latch springs are rotatably attached to a respective latch/release lever which, when activated, engage the opposite latch member which has a lever retainer clip attached to an opposite end of the flex band. Thus, each of the two latch members have lever retainer clips rotatably attached to the draw springs that are movable to engage spring retainer clips attached to each end of the flex band to join or release the free ends of the flex band and latch and unlatch the flex band assembly from the joined conduits. The latch member may also include a lever portion hinged to the clamping spring that can be positioned in a latched position. A first latch member is attached to the first free end of the flex band and engages the second free end of the flex band with the draw spring when the latch mechanism is activated. A second latch member is attached to the second free end of the flex band and engages the first free end of the flex band with the draw spring when the latch mechanism is activated. Thus, the illustrative system provides by using two draw springs, at least two sources of tension force that separately draw the first and second free ends of a flex band assembly together and providing a redundant clamping system for holding two fluid conduits in sealing contact.

The exemplary clamping system features quick latching and unlatching within extremely limited spaces without the use of tools. It also provides for latch redundancy using redundant draw springs that provide opposing tension forces either of which can function independently should one retention spring or latch fail since a single draw spring can be implemented to provide all of the required clamping force. The levered lock/release latch mechanisms may also snap-in-place for retention and storage of the latch levers. The multi fingered flex band assembly eliminates the need for a hinge in the flex band and provides for a weight reduction by using slots formed in the flex band. The fingers that extend from the flex band hold the flex band in position on the two joined conduit flanges.

DETAILED DESCRIPTION

Figure 1:
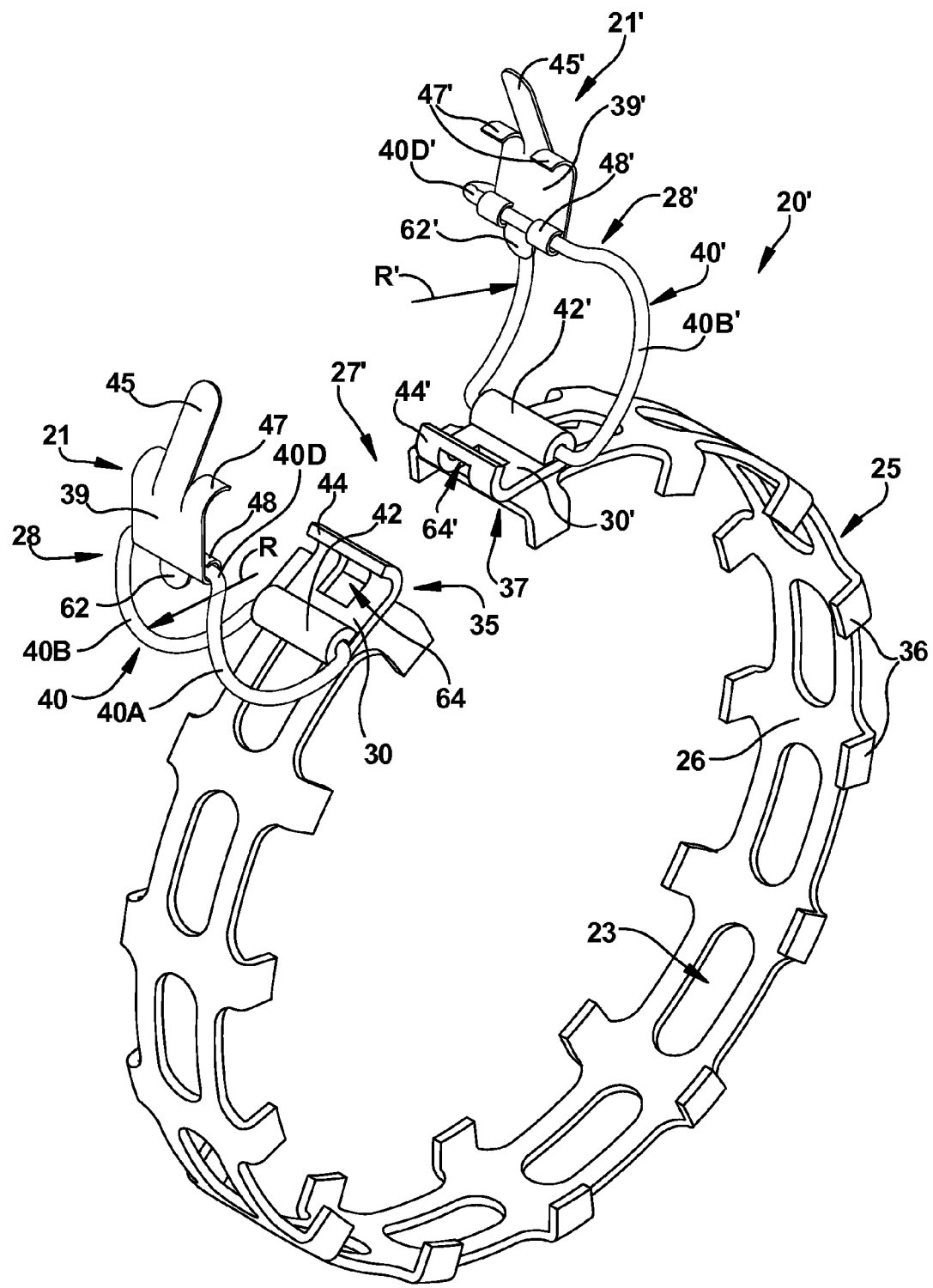
FIG. 1 is a perspective view of the present clamping system shown in an unlatched condition.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 2:
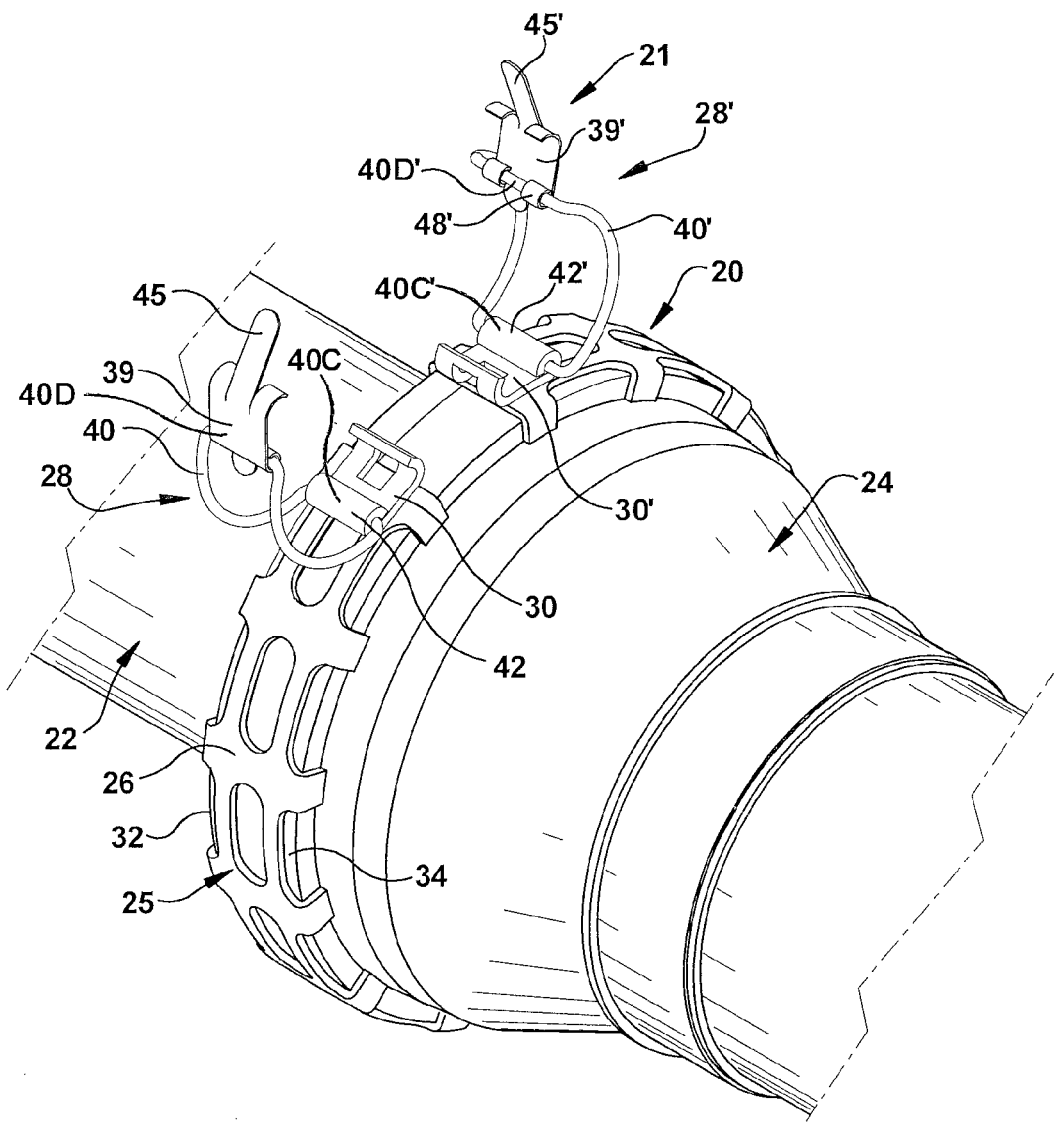
FIG. 2 is a perspective view of the present clamping system shown in an unlatched condition installed on a joined pair of fluid conduits.

Now referring to the drawings and particularly to FIG. 1, a perspective view of an exemplary conduit clamping system 20 is shown in an unlatched condition which includes a flex band assembly 25 including a flex band 26 with a band end gap 27 which is drawn together by a latching mechanism 21. The conduit clamping assembly 20 provides a redundant latching function which includes the flex band assembly 25 drawn together by the latching mechanism 21 where the latching mechanism 21 consists of at least two separate latch mechanisms shown as a first latch mechanism 28 and a corresponding opposed second latch mechanism 28'. In the illustrative approach either the first latch mechanism 28 or the second latch mechanism 28' can provide the retention clamping force on the flex band 26 to retain, for instance, the sections of a fluid conduit such as fuel tubing sections. To provide the retention clamping force on the flex band 26, both the first latch mechanism 28 and the second latch mechanism 28' may be used to provide for redundancy in the clamping force since either the first latching mechanism 28 or the second latching mechanism 28' can be configured to provide the required clamping force to retain for example, a first conduit 22 in contact with a second conduit 24 as shown in FIG. 2. Such redundancy provides for continuation of the flow of fluid through the joined sections of a conduit even if one of the latch mechanisms 28, 28' fails or is not latched properly.

The two latch mechanisms shown as the first latch mechanism 28 and the opposing second latch mechanism 28' apply a clamping force to the flex band assembly 25 that draws the end gap 27 formed by a first band end 35 and the second band end 37 toward closure. Either the first latch mechanism 28 or the second latching mechanism 28' can provide the retention clamping force on the flex band assembly 25 which is useful for clamping tubing and other types of conduit assemblies together for conduction of fluid flow therein. To provide the required retention clamping force on the flex band assembly 25 under any most any operational condition, both the first latch mechanism 28 and the second latch mechanism 28' are used to provide for redundancy in providing the required clamping force. In the flex band 26, at least one slot 23 can be formed therein to provide for a decrease in overall weight of the flex band assembly 25 which is standard practice in the aircraft industry.

Thus, the flex band assembly 25 has the first band end 35 that is drawn towards the second band end 37 when the first or the second latching mechanisms 28, 28' are activated. This draws the flex band assembly 25 around a conduit or tubing connection section (see FIG. 2). The flex band assembly 25 consists of a flat flex band 26 that encircles and lays flat against the tubing connection section and has first and second band ends 35, 37 which oppose one another and have a relatively small separation there between. A plurality of flex band tabs 36 extend inwardly from both edges of the flex band 26 and extend at an angle from the flex band 26 so as to position the flex band 26 on the connection section at the interface between two conduits. The flex band 26 is made of a flexible material such as steel or a like material that can be opened up by spreading its first band end 35 from its second band end 37 to allow the flex band assembly 25 to be assembled to or removed from a conduit connection.

In addition to the first and second latch mechanisms 28, 28', additional similar latch mechanisms could be utilized in a separate location on the flex band 26 which has corresponding additional sets of opposed open ends in the flex band 26 thereby dividing the flex band 26 into separate sections. Or alternatively, additional parallel latch mechanisms could be positioned on the flex band 26 to draw the first band end 35 towards the second band end 37 thereby providing additional redundancy to the first and second latch mechanisms 28, 28'.

The first latch mechanism 28 consists of a first draw spring 40 that is shown as being approximately rectangular in shape and has a radiused bend R in two opposed spring leg sections 40A, 40B where the spring leg sections 40A, 40B are joined by spring end sections 40C, 40D which are hidden in FIG. 1 by a lever spring retainer 48 and by a first end clip 42 respectively.

In one exemplary approach, the first draw spring 40 has spring end sections 40C, 40D that are slightly wider than the spring end sections 40C', 40D' of a second draw spring 40' used in the second latch mechanism 28'. Note that spring end section 40C' is hidden from view in FIG. 1 by a second end clip 42'. Alternately, the spring end sections 40C, 40D could be the same width as the spring end sections 40C', 40D' of the second draw spring 40' where the spring leg sections 40A', 40B' are allowed to flex outward of the spring leg sections 40A, 40B when the conduit clamping assembly 20 is installed. In still another example, either the first or second draw springs 40, 40' is tapered in width to allow the draw springs 40, 40' to clear one another when the first and second latch mechanisms 28, 28' are activated. In yet another example, a clearance bend is formed in the spring leg sections 40A, 40B or spring leg sections 40A', 40B' to provide clearance between the spring leg sections 40A, 40B and 40A', 40B' when the first and second latch mechanisms 28, 28' are respectively latched.

A first retainer plate 30 is attached proximate to the first band end 35 and includes both a first end clip 42 and a first band retainer clip 44. The first retainer plate 30 can be separately formed and then attached to the flex band 26 or it can be formed integral with the flex band 26, or any portion of the first retainer plate 30 can be separately formed and then the remaining portion of the first retainer plate 30 can be formed integral with the flex band 26. Various materials can be used for the various components of the conduit clamping system 20 including the first retainer plate 30. Some examples are steel, aluminum, cast iron, cast aluminum, spring steel, engineered plastic, composites and ceramics.

The spring end section 40C is rotatably secured to the flex band 26 using the first end clip 42 where the first end clip 42 is secured to or formed as part of the flex band 26. A first latch lever 39 is rotatably mounted to the spring end section 40D by a lever spring retainer 48 where the first latch lever 39 has a finger tab 45 for the operator/installer to push or pull on to activate (latch) or de-activate (unlatch) the first latch mechanism 28. To activate the first latch mechanism 28, the draw spring end section 40C is pushed towards the second band end 37 using the finger tab 45. The lever spring retainer 48 is then hooked onto a first band retainer clip 44 and a first lever retention clip 47 then frictionally engages the second end clip 42' formed into or attached to the flex band 26. The operator then forces the finger tab 45 towards the flex band 26 which causes the first latch lever 39 to go over center and to produce a tension on the first draw spring 40 and to be latched into position when the first lever retainer clip 47 frictionally engages and clips onto the second end clip 42'. The clamping force generated by the draw spring 40 and the first lever retention clip 47 combine to hold the first latch lever 39 in the activated position.

In an identical but opposite fashion to the operation of the first latch mechanism 28, the second latch mechanism 28' is used to also provide a clamping force on the first and second band ends 35, 37 to draw the first band end 35 towards the second band end 37. Thus, with the exception of the width of the second draw spring 40', the second latch mechanism 28' is substantially identical in construction with the first latch mechanism 28 but is attached to the second band end 37 at the second end clip 42' by the second draw spring 40' and more specifically by draw spring end 40C' and is thereby positioned to oppose the first latch mechanism 28. Thus, the first latch mechanism 28 is permanently attached proximate to the first band end 35 while the second latch mechanism 28' is permanently attached proximate to the second band end 37. When activated, both the first and second latch mechanisms 28, 28' act to draw the first band end 35 towards the second band end 37 thereby tightening the flex band 26 and securing the tubing or conduit connection (see FIG. 2).

The second latch mechanism 28' consists of a second draw spring 40' that is shown as being approximately rectangular in shape when viewed in a top plan view (see FIG. 9) and has a bend with a slight radius R' in the two opposed spring leg sections 40A', 40B' when viewed in a side plan view where the spring leg sections 40A', 40B' are joined by spring end sections 40C' and 40D'. In the preferred embodiment, the length of spring end sections 40C' and 40D' of the second draw spring 40' are slightly longer than the spring end sections 40C and 40D of the first draw spring 40. This allows the first draw spring 40 to be positioned inside the second draw spring 40' when the first and second latch mechanisms 28, 28' are latched. In a second embodiment, the second draw spring 40' is tapered in width and the first draw spring 40 is rectangular where the spring end section 40C' is slightly wider than opposite spring end section 40D'. Alternately, the first and second spring end sections 40C and 40D respectively, could be the same width but the first and second draw springs 40, 40' are allowed to flex outward when the latch mechanisms 28, 28' are latched.

A first retainer plate 30' is attached proximate to the first band end 35' and includes both the first end clip 42' and the second band retainer clip 44'. The first retainer plate 30' can be separately formed and then attached to the flex band 26 or it can be formed integral with the flex band 26 or any portion of the first retainer plate 30' can be separately formed and then the remaining portion of the first retainer plate 30' can be formed integral with the flex band 26. Various materials can be used for the various components of the conduit clamping system 20' including the first retainer plate 30'. Some examples are steel, aluminum, cast iron, cast aluminum, spring steel, engineered plastic, composites and ceramics.

The second draw spring 40' is connected to both the flex band 26 and a second latch lever 39' by the spring end sections 40C' and 40D' respectively. The spring end section 40C' is rotatably secured to the flex band 26 using the second end clip 42' where the second end clip 42' is secured to or formed as part of the flex band 26. The second latch lever 39' is rotatably mounted to the spring end section 40D' where the second latch lever 39' has a finger tab 45' for the operator/installer to push or pull on to activate the second latch mechanism 28'. When the second latch mechanism 28' is activated, the draw spring end section 40D' is pushed towards the first band end 35 using the finger tab 45. The second lever spring retainer 48' is then hooked onto the first band retainer clip 44 and the second lever retainer clip 47' then engages the first end clip 42 which is formed into or attached to the flex band 26. The operator forces the finger tab 45 towards the flex band 25 which causes the second latch lever 39' to go over center and to produce a tension on the second draw spring 40' and to be latched into position. The second latch lever 39' is also held in a latched (activated) position by the second lever retainer clip 47' when it engages and clips into the first end clip 42.

Now referring again to the drawings and particularly to FIG. 2, a perspective view of the conduit clamping assembly 20 is shown in an unlatched condition. A first conduit 22 is retained to a second conduit 24 at first and second conduit flanges 32, 34 using the conduit clamping assembly 20 to provide a redundant latching function the conduit clamping system 20 includes the flex band assembly 25 having a flex band 26 with an end gap which is drawn together by first and second latch mechanisms 28, 28'. In the flex band 26, at least one slot 23 can be formed therein to provide for a decrease in overall weight of the flex band assembly 25 which is standard practice in the aircraft industry. A plurality of tabs 36 extend from the flex band 26 inward toward the center of the flex band 26 at an angle so as to position and hold the flex band assembly 25 in position on the first and second conduit flanges 32, 34 where the first and second conduit flanges 32, 34 are formed on the ends of first and second fluid conduits 22, 24 respectively. The flex band latching mechanism 21 consists of at least two latching mechanisms shown as the first latching mechanism 28 and an opposed corresponding second latching mechanism 28'. Either the first latching mechanism 28 or the second latching mechanism 28' can provide a required retention clamping force on the flex band assembly 25 to retain the first conduit 22 in sealing contact with the second conduit 24 to provide for the flow of a fluid between the first conduit 22 and the second conduit 24. To provide the required retention clamping force on the flex band assembly 25, both the first latch mechanism 28 and the second latch mechanism 28' are used to provide for redundancy in providing the required clamping force so that either the first latching mechanism 28 or the second latching mechanism 28' can provide the required clamping force to retain the first conduit 22 in contact with the second conduit 24. This provides for continuation of the flow of fluid through the first and second conduits 22, 24 even if one of the latching mechanisms 28, 28' fails or is not latched properly.

The first conduit 22 has a first conduit flange 32 formed on one end which abuts a second conduit flange 34 formed on one end of the second conduit 24 where the first conduit flange 32 is held firmly against the second conduit flange 34 using the conduit clamping assembly 20 thereby providing a fluidic seal between the first and second conduits 22, 24. The flex band assembly 25 has a first band end 35 that is drawn towards a second band end 37 when either the first or the second latching mechanisms 28, 28' are activated. This draws the flex band assembly 25 around the first and second conduit flanges 32, 34. A plurality of flex band fingers 36 extend from both edges of the flex band 26 and extend at an angle from the flex band 26 so as to facilitate the positioning of the flex band 26 on the first and second conduit flanges 32, 34. The flex band 26 is made of a flexible material such as steel or a like material that can be opened up by spreading its first band end 35 from its second band end 37 to allow the flex band assembly 25 to be installed or removed from the first and second conduit flanges 32, 34. This allows the first conduit 22 to be assembled to or separated from the second conduit 24 by de-activation of both the first and second latching mechanisms 28, 28'.

Thus, the conduit clamping assembly 20 consists of at least a first latch mechanism 28 and a second latch mechanism 28' that function to draw the first and second band ends 35, 37 towards one another to tighten the flex band assembly 25 around the first and second conduit flanges 32, 34 to secure the first conduit 32 to the second conduit 34.

The first latch mechanism 28 consists of a first draw spring 40 that is shown as being approximately rectangular in shape and has a radiused bend R in two opposed spring leg sections 40A, 40B where the spring leg sections 40A, 40B are joined by spring end sections 40C, 40D which are hidden in FIG. 2 by the lever spring retainer 48 and by the first end clip 42 respectively. In the preferred embodiment, the first draw spring 40 has spring end sections 40C, 40D that are slightly wider than the spring end sections 40C', 40D' of a second draw spring 40' used in the second latch mechanism 28'. Note that spring end section 40C' is hidden from view in FIG. 2 by the second end clip 42'. Alternately, the spring end sections 40C, 40D could be the same width as the spring end sections 40C', 40D' of the second draw spring 40' where the spring leg sections 40A', 40B' are allowed to flex outward of the spring leg sections 40A, 40B when the conduit clamping assembly 20 is installed. In still another embodiment, either the first or second draw springs 40, 40' is tapered in width to allow the draw springs 40, 40' to clear one another when the first and second latch mechanisms 28, 28' are activated. In still another embodiment, a clearance bend is formed in the spring leg sections 40A, 40B or spring leg sections 40A', 40B' to provide clearance between the spring leg sections 40A, 40B and 40A', 40B' when the first and second latch mechanisms 28, 28' are latched.

The spring end section 40C is rotatably secured to the flex band 26 using the first end clip 42 where the first end clip 42 is secured to or formed as part of the flex band 26. First latch lever 39 is rotatably mounted to the spring end section 40D by a lever spring retainer 48 where the first latch lever 39 has a finger tab 45 for the operator/installer to push or pull on to activate (latch) or de-activate (unlatch) the first latch mechanism 28. To activate the first latch mechanism 28, the first draw spring end section 40C is pushed towards the second band end 37 using the finger tab 45. The lever spring retainer 48 is then hooked onto the second band retainer clip 44' and a first lever retention clip 47 then frictionally engages the second end clip 42' formed into or attached to the flex band 26. The operator then forces the finger tab 45 towards the flex band 26 which causes the first latch lever 39 to go over center and to produce a tension on the first draw spring 40 and to be latched into position when the first lever retainer clip 47 frictionally engages and clips onto the second end clip 42'. The clamping force generated by the draw spring 40 and the first retention clip 47 combine to hold the first latch lever 39 in the activated latched position.

In an identical but opposite fashion to the operation of the first latch mechanism 28, the second latch mechanism 28' is used to also provide a clamping force on the first and second band ends 35, 37 to draw the first band end 35 towards the second end 37. Thus, with the exception of the width of the second draw spring 40', the second latch mechanism 28' is substantially identical in construction with the first latch mechanism 28 but is attached to the second band end 37 at the second end clip 42' by the second draw spring 40' and more specifically by the draw spring end section 40C' and is thereby positioned opposite to the first latch mechanism 28. Thus, the first latch mechanism 28 is permanently attached proximate to the first band end 35 while the second latch mechanism 28' is permanently attached proximate to the second band end 37. When activated, both the first and second latch mechanisms 28, 28' act to draw the first band end 35 towards the second band end 37 thereby tightening the flex band 26 and securing the tubing or conduit connection.

The second latch mechanism 28' consists of a second draw spring 40' that is shown as being approximately rectangular in shape when viewed in a top plan view (see FIG. 9) and has a bend with a slight radius R' in the two opposed spring leg sections 40A', 40B' when viewed in a side plan view where the spring leg sections 40A', 40B' are joined by spring end sections 40C' and 40D'. In the preferred embodiment, the length of spring end sections 40C' and 40D' of the second draw spring 40' are slightly longer than the spring end sections 40C and 40D of the first draw spring 40. This allows the first draw spring 40 to be positioned inside the second draw spring 40' when the first and second latch mechanisms 28, 28' are latched. In an alternative embodiment, the second draw spring 40', spring end section 40C' is slightly wider than opposite spring end section 40D'. Alternately, the spring end sections 40C and 40D respectively, could be the same width but are allowed to flex outward when the latch mechanisms 28, 28' are activated. Generally, for purposes of this application, arrangements described with regard to the first draw spring 40 are equally applicable to the second draw spring 40' and vias versa.

The second draw spring 40' is connected to both the flex band 26 and the second activation lever 39' by the spring end sections 40C' and 40D' respectively. The spring end section 40C' is rotatably secured to the flex band 26 using the second end clip 42' where the second end clip 42' is secured to or formed as part of the flex band 26. The second latch lever 39' is rotatably mounted to the spring end section 40D' where the second latch lever 39' has a finger tab 45' for the operator/installer to push or pull on to activate the second latch mechanism 28'. When the second latch mechanism 28' is activated, the draw spring end 40D' is pushed towards the first band end 35 using the finger tab 45. The lever spring retainer 48' is then hooked onto the second band retainer clip 44 and the second lever retainer clip 47' then engages the first end clip 42 which is formed into or attached to the flex band 26. The operator forces the finger tab 45 towards the flex band 25 which causes the second latch lever 39' to go over center and to produce a tension on the second draw spring 40' and to be latched into position. The second lever retainer clip 47' when it engages and clips onto the first end clip 42.

Figure 3:
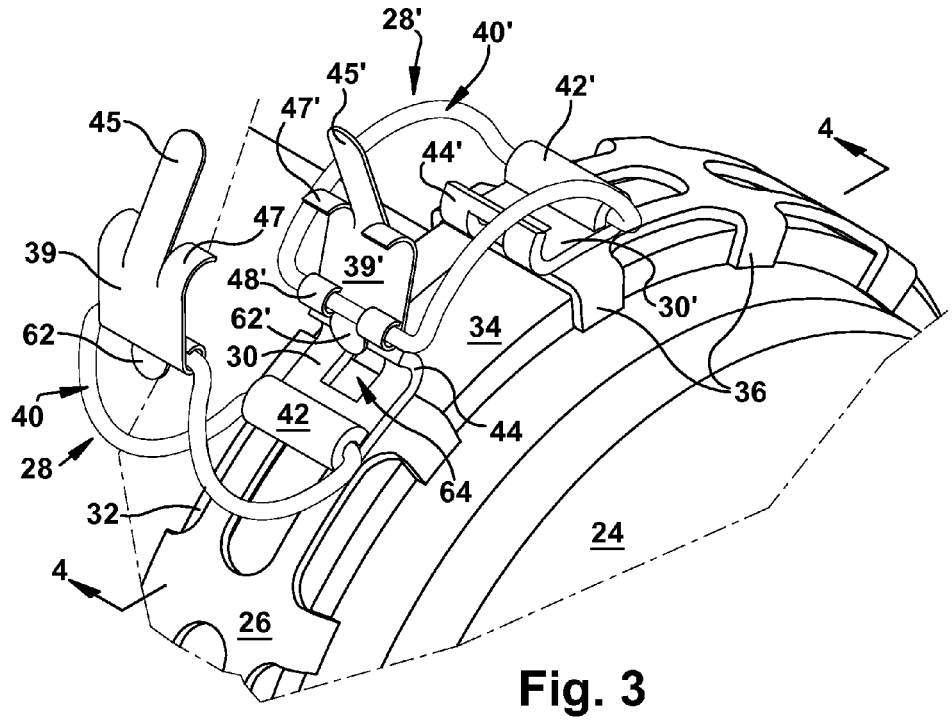
FIG. 3 is a partial perspective view of the present clamping system showing one of the latch mechanisms in a partially latched condition and the other in an unlatched condition.

Now referring to FIG. 3, a partial perspective view of the conduit clamping system 20 is shown with the first latch mechanism 28 unlatched and the second latch mechanism 28' partially latched. In the preferred embodiment, the first end clip 42 is formed as one piece with the first band retainer clip 44 and the second end clip 42' is made as one piece with the second band retainer clip 44'. The one piece assemblies including the end clips 42, 42' and retainer clips 44, 44' are fastened to the flex band 26 proximate to the first and second band ends 35, 37. A second latch lever 39' is rotatably mounted to the spring end section 40D' where the second latch lever 39' has a finger tab 45' for the mechanic or installer to push or pull on to activate the second latch mechanism 28'. When the second latch mechanism 28' is activated, the second draw spring end section 40D' is pushed towards the first band end 35 using the finger tab 45'. A latch hook tab 62' extends from the second latch lever 39' and is positioned to engage a clip slot 64 formed in the first band retainer clip 44. Later, as the second latch mechanism 28' is closed, the second lever retainer clip 47' engages the first end clip 42 formed in or attached to the first retainer plate 30 and the flex band 26. The installer then forces the finger tab 45' towards the flex band 25 which causes the second latch lever 39' to go over center and to produce a tension on the second draw spring 40' and to force the second latch mechanism into a latched position. Thus, the second lever retainer clip 47' frictionally engages the first end clip 42. Note that flex band tabs 36 extend inwardly at an angle relative to the flex band 26 and hold the flex band 26 in position on the first and second conduit flanges 32, 34. The first and second conduit flanges 32, 34 are held firmly together by the clamping action of the conduit clamping system 20 of the present clamping system.

Figure 4:
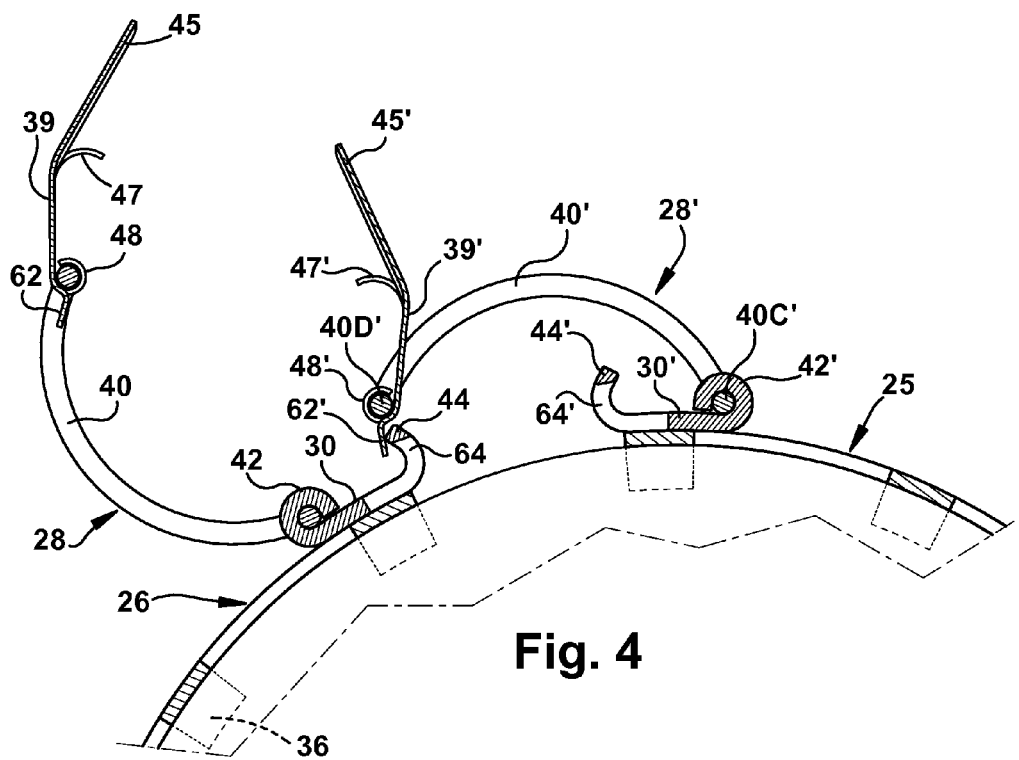
FIG. 4 is a sectional view of the latch mechanisms and flex band assembly of the present clamping system shown in FIG. 3.

Now referring to FIG. 4 of the drawings, a cross-sectional view of the conduit clamping system 20 taken along line 4-4 of FIG. 3 is shown. The second latch hook tab 62' is shown engaging the first band retainer clip 44 at the clip slot 64 which facilitates the engagement of a second lever spring retainer 48' into the first band retainer clip 44 as the second latch lever 39' is moved into its latched position.

Figure 5:
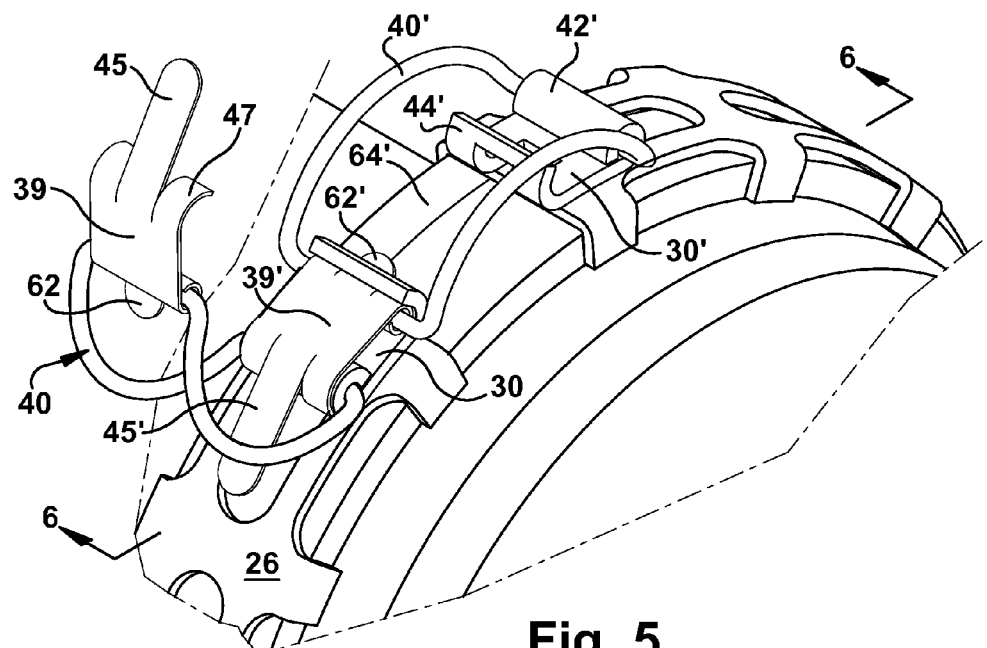
FIG. 5 is a partial perspective view of the present clamping system showing one of the latch mechanisms in a latched condition and the other in an unlatched condition.

Now referring to FIG. 5 of the drawings, a partial perspective view of the conduit clamping system 20 shown with the second latch mechanism 28' being fully latched and the first latch mechanism 28 being fully unlatched. The second latch lever 39' has been rotated to frictionally engage the first end clip 42 by its retainer clip 47' and thereby become latched into position. The second lever spring retainer 48' has fully engaged the first band retainer clip 44 and a tension load has been generated by the second draw spring 40' on the flex band 26 sufficient to maintain a clamping force on the conduit flanges 32, 34 to maintain a fluidic seal between the first and second conduits 22, 24 (see FIG. 2).

Latch hook tabs 62' and 62' extend from the first and second latch levers 39, 39' respectively and function to assist in latching the first and second latch mechanisms 28, 28' into a fully latched condition. The latch hook tabs 62, 62' engage the clip slots 64 and 64' respectively (see also FIG. 8) as the first and second latch mechanisms 28, 28' are activated. To hold the first and second latch levers 39, 39' in the fully latched position, lever retention clips 47, 47' frictionally engage the second end clip 42' and the first end clip 42 respectively. FIG. 5 shows the second latch mechanism 28' fully activated (latched) where the latch hook tab 62' has fully engaged the clip slot 64' (see also FIG. 4) and the retention clip 47' has fully engaged the first end clip 42.

Figure 6:
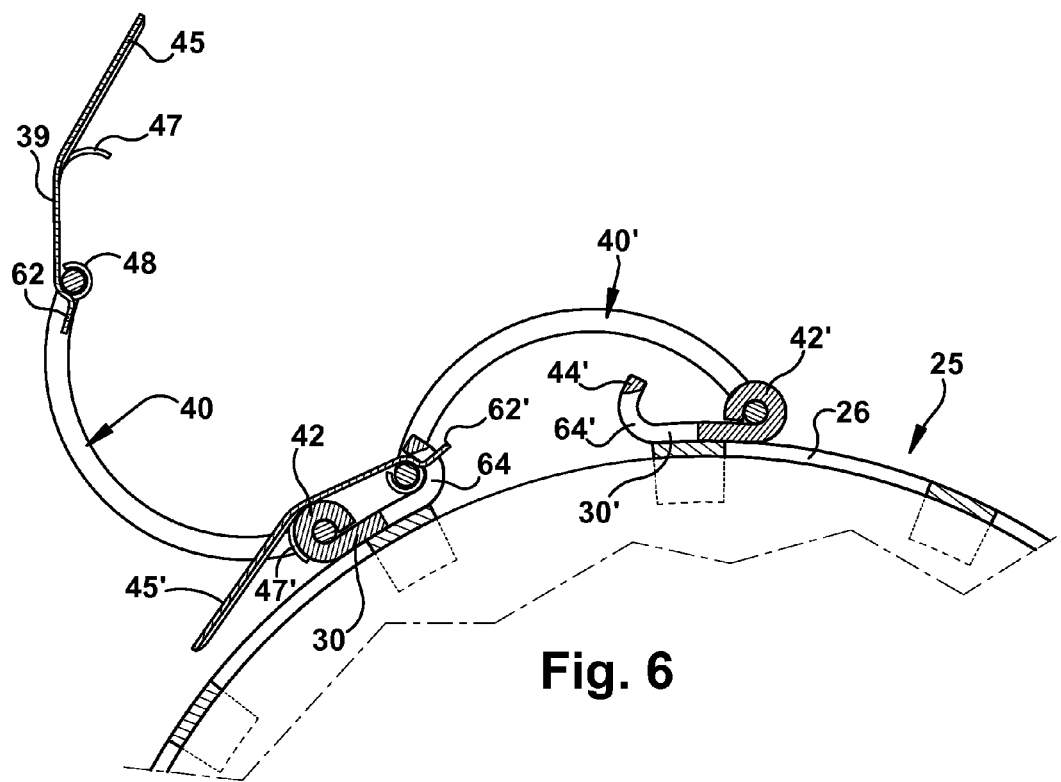
FIG. 6 is a sectional view of the latch mechanisms and flex band assembly shown in FIG. 5.

Now referring to FIG. 6 of the drawings, a cross-sectional view of the conduit clamping system 20 taken along line 6-6 of FIG. 5 is shown with the second latch mechanism 39' being fully latched and the first latch mechanism 28 being fully unlatched. The second latch lever 39' has been rotated so that the retention clip 47' frictionally engages the first end clip 42 and thereby hold the second latch mechanism 28' into a latched position. The second lever spring retainer 48' has fully engaged the first band retainer clip 44 and a tension load has been generated by the second draw spring 40' and applied to the flex band 26 sufficient to maintain a fluidic seal between the first and second conduits 22, 24 (see FIG. 2).

Latch hook tabs 62 and 62' extend from the first and second latch levers 39, 39' respectively and function to assist in latching the first and second latch mechanisms 28, 28' into a fully latched condition. The latch hook tabs 62, 62' engage the clip slots 64 and 64' respectively as the first and second latch mechanisms 28, 28' are activated. To hold the first and second latch levers 39, 39' in the fully latched position, lever retention clips 47, 47' frictionally engage the second end clip 42' and the first end clip 42 respectively Now referring to FIG. 7 of the drawings, a partial perspective view of the conduit coupling system 20 is shown with both the first and second latch mechanisms 28, 28' being in a fully latched condition. Clearly shown is how the first draw spring 40 fits inside of the wider second draw spring 40'. Again, the first draw spring 40 can be dimensioned to fit outside of the second draw spring 40' which will function in an equivalent to the opposite condition where the first draw spring 40 would fit inside the second draw spring 40'. The lever spring retainers 48, 48' have engaged the first and second band retainer clips 44, 44' respectively and the lever retention clips 47, 47' are frictionally clipped onto the second and first end clips 42', 42 respectively. This holds the first and second latch levers 39, 39' into a closed latched position until an operator pulls the lever fingers 45, 45' upward away from the flex band 26.

Figure 7:
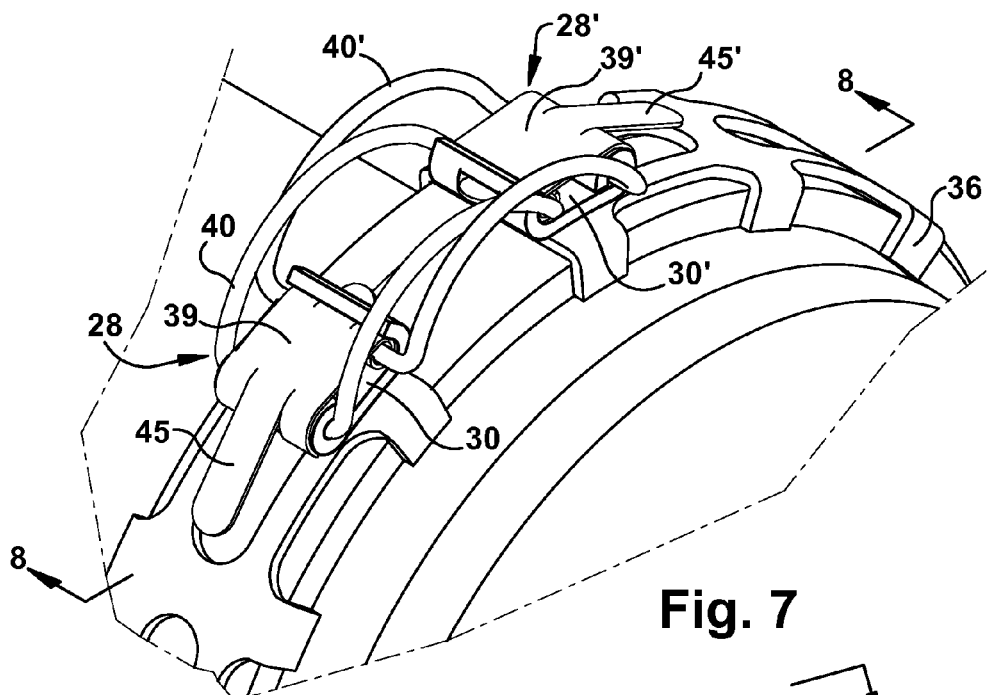
FIG. 7 is a partial perspective view of the present clamping system showing the latch mechanisms in a fully latched condition.
Figure 8:
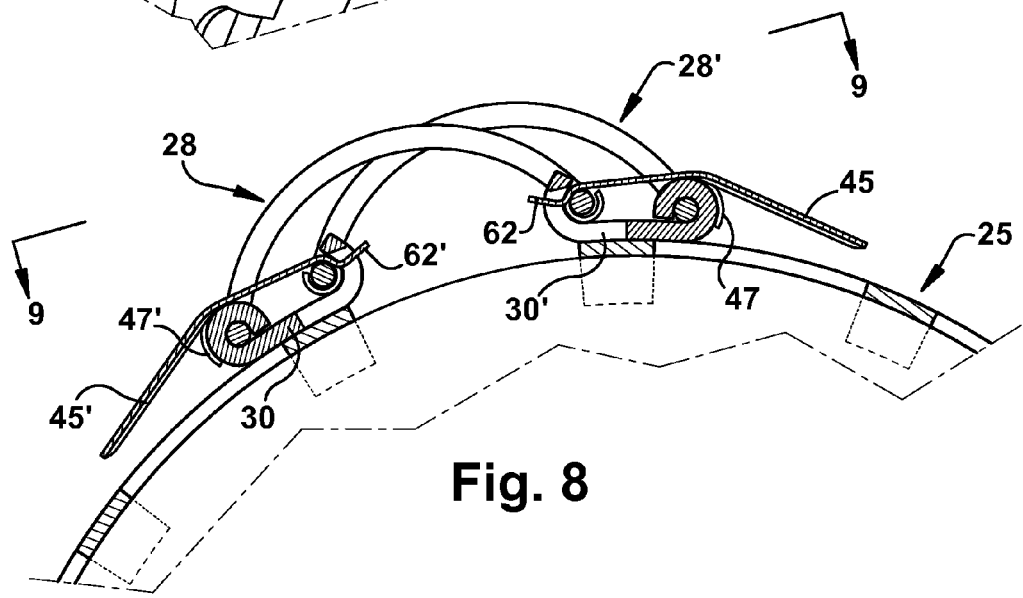
FIG. 8 is a sectional view of the latch mechanisms and flex band assembly of the present clamping system shown in FIG. 7.

Now referring to FIG. 8 of the drawings, a cross-sectional view of the conduit clamping system 20 taken along line 8-8 of FIG. 7 is shown with both the first and second latch mechanisms 28, 28' being in a fully latched condition. Clearly shown is how the first draw spring 40 fits inside of the second draw spring 40'. The lever spring retainers 48, 48' have engaged the first and second band retainer clips 44, 44' respectively and the lever retention clips 47, 47' are frictionally clipped onto the second and first end clips 42', 42 respectively. This holds the first and second latch levers 39, 39' into a closed, latched position until an operator pulls the lever fingers 45, 45' upward away from the flex band 26.

Figure 9:
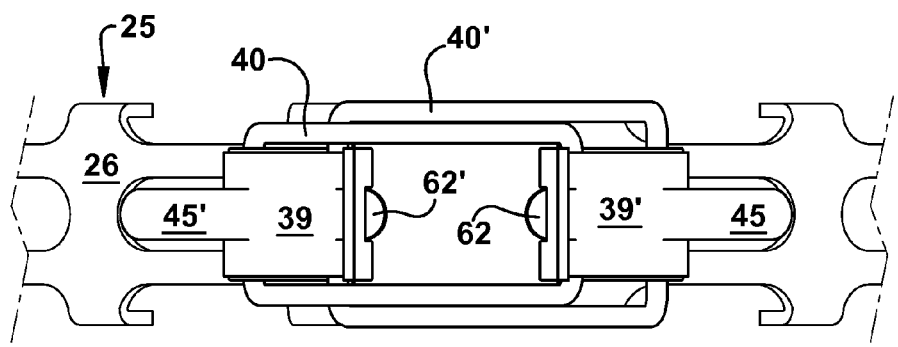
FIG. 9 is a top plan view of the latch mechanisms and flex band assembly of the present clamping system showing the latch mechanisms in a fully latched condition.

Now referring to FIG. 9 of the drawings, a partial top plan view of the conduit clamping system 20 taken along line 9-9 of FIG. 8 is shown with both the first and second latch mechanisms 28, 28' being in a fully latched condition. Clearly shown is how the first draw spring 40 fits inside of the second draw spring 40'. First draw spring 40 is shown as narrower than the second draw spring 40' but the opposite situation where the first draw spring 40 is wider than the second draw spring 40' would work equally as well. The lever spring retainers 48, 48' are shown fully engaging the first and second band retainer clips 44, 44' respectively. This along with the tension force of the draw springs combine to hold the first and second latch levers 39, 39' into a closed position until an operator pulls the lever fingers 45, 45' upward away from the flex band 26.

The conduit clamping assembly 20 provides a redundant latching function which includes the flex band assembly 26 drawn together by the latching mechanism 21. The latching mechanism 21 consists of at least two latch mechanisms shown as a first latch mechanism 28 and a corresponding opposed second latch mechanism 28'. Either the first latch mechanism 28 or the second latch mechanism 28' can provide the required retention clamping force on the flex band assembly 25 to retain, for instance, the sections of a fluid conduit such as fuel line tubing sections. To provide the retention clamping force on the flex band assembly, both the first latch mechanism 28 and the second latch mechanism 28' are used to provide for redundancy in the clamping force because either the first latching mechanism 28 or the second latching mechanism 28' can provide the required clamping force to retain for example, the first conduit 22 in contact with the second conduit 24 of FIG. 2. This provides for continuation of the flow of fluid through sections of a conduit even if one of the latch mechanisms 28, 28' fails or is not latched properly.

Figure 10:
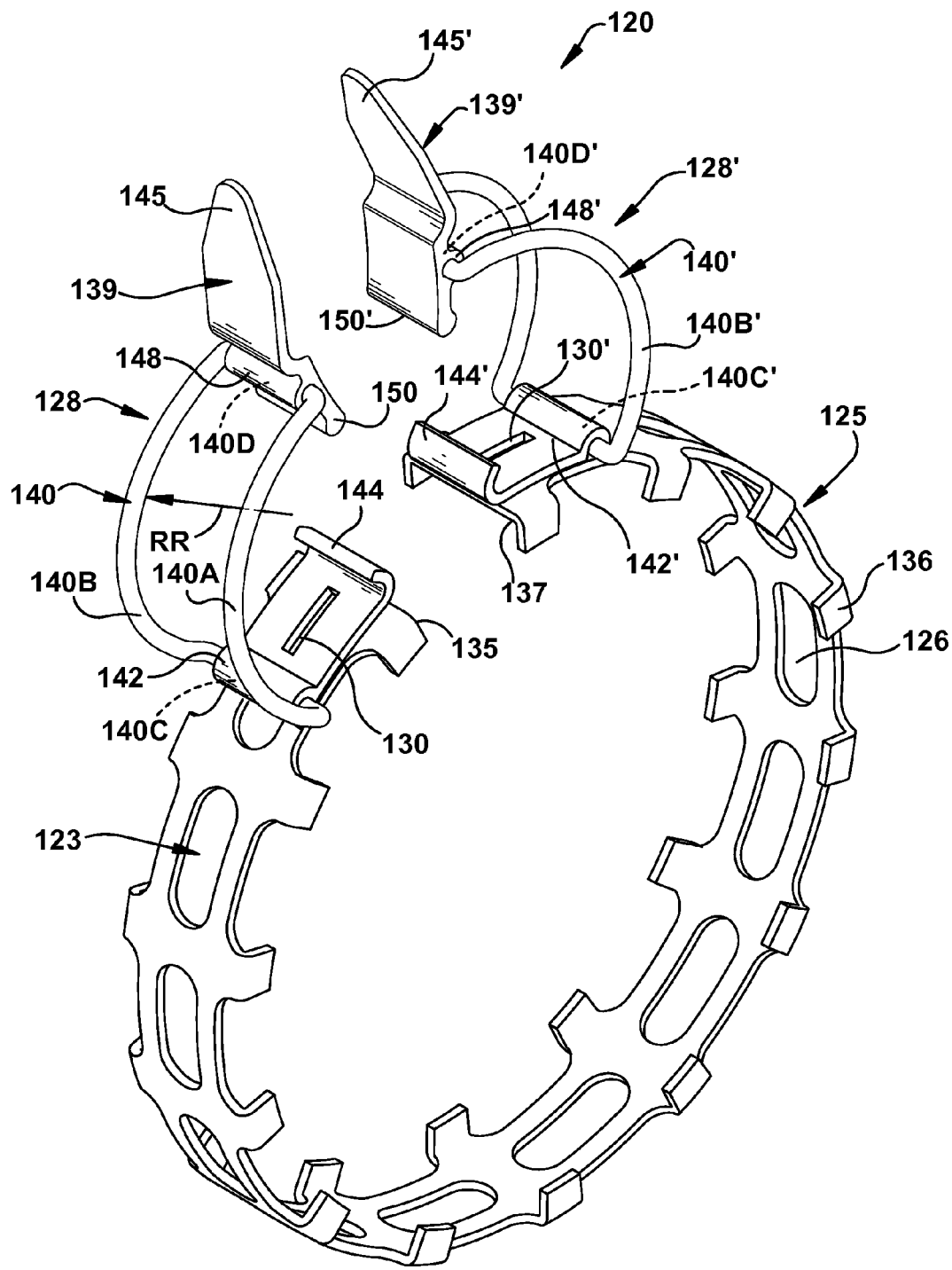
FIG. 10 is a perspective view of an alternative clamping system shown in an unlatched condition.

Now referring to the drawings and particularly to FIG. 10, a perspective view of an alternative exemplary conduit clamping system 120 is shown in an unlatched condition which includes a flex band assembly 125 having a flex band 126 with a band end gap 127 which is drawn together by a latching mechanism 121. The primary distinguishing feature of the structure shown in FIG. 10 as compared to that shown in FIG. 1 is the attachment location of the draw springs 140, 140' on the latch levers 139, 139'. The conduit clamping assembly 120 provides a redundant latching function which includes the flex band assembly 125 drawn together by the latching mechanism 121 which consists of at least two latch mechanisms shown as a first latch mechanism 128 and a corresponding opposed second latch mechanism 128'. In the illustrative approach either the first latch mechanism 128 or the second latch mechanism 128' can provide the retention clamping force on the flex band assembly 125 to retain, for instance, the sections of a fluid conduit such as fuel tubing sections or a pair of liquid carrying conduits. To provide the retention clamping force on the flex band assembly 125, both the first latch mechanism 128 and the second latch mechanism 128' may be used to provide for redundancy in the clamping force since either the first latching mechanism 128 or the second latching mechanism 128' can be configured to provide the required clamping force to retain for example, a first conduit 22 in contact with a second conduit 24 (see FIG. 2). Such redundancy provides for continuation of the flow of fluid through sections of a conduit even if one of the latch mechanisms 128, 128' fails or is not latched properly.

Two latch mechanisms shown as a first latch mechanism 128 and an opposing second latch mechanism 128' apply a force to the flex band assembly 125 that draws the end gap 127 formed by a first band end 135 and the second band end 137 toward closure. Either the first latch mechanism 128 or the second latching mechanism 128' can provide the retention clamping force on the flex band assembly 125 which is useful for clamping tubing assemblies together for conduction of fluid flow therein. To provide the required retention clamping force on the flex band assembly 125, in the event of failure of either of the latch mechanisms 128, 128' both the first latch mechanism 128 and the second latch mechanism 128' are used to provide for redundancy in providing the required clamping force.

Thus, the flex band assembly 125 has the first band end 135 that is drawn towards the second band end 137 when the first or the second latching mechanisms 128, 128' are activated. This draws the flex band assembly 125 around a conduit or tubing connection section (see FIG. 2). The flex band assembly 125 consists of a flat flex band 126 that encircles and lays flat against the connection section and has first and second band ends 135, 137 which oppose one another and have a relatively small separation there between. A plurality of flex band tabs 136 extend inwardly from both edges of the flex band 126 and extend at an angle from the flex band 126 so as to position the flex band 126 on the connection section at the interface between two conduits. The flex band 126 is made of a flexible material such as steel or a like material that can be opened up by spreading its first band end 135 from its second band end 137 to allow the flex band assembly 125 to be assembled to or removed from a conduit interface connection such as that shown as conduits 22, 24 in FIG. 2.

The first retainer plate 130 is attached proximate to the first band end 135 and includes both the first end clip 142 and the first band retainer clip 144. The first retainer plate 130 can be separately formed and then attached to the flex band 126 or it can be formed integral with the flex band 126 or any portion of the first retainer plate 130 can be separately formed and then the remaining portion of the first retainer plate 130 can be formed integral with the flex band 126. Various materials can be used for the various components of the conduit clamping system 120 including the first retainer plate 130. Some examples are steel, aluminum, cast iron, cast aluminum, spring steel, engineered plastic, composites and ceramics.

The second retainer plate 130' is attached proximate to the second band end 137 and is shown as formed to include both the second end clip 142' and the second band retainer clip 144'. The second retainer plate 130' can be separately formed and then attached to the flex band 126 or it can be formed integral with the flex band 126 or any portion of the second retainer plate 130' can be separately formed and then the remaining portion of the second retainer plate 130' can be formed integral with the flex band 126. Various materials can be used for the various components of the conduit clamping system 120. Examples are steel, aluminum, cast iron, cast aluminum, spring steel, engineered plastic, composites and ceramics. Competing requirements including performance, cost and weight dictate what material is selected for each of the components including the first and second retainer plates 130, 130'. In the flex band 126, at least one slot 123 can be formed therein to provide for a decrease in overall weight of the flex band assembly 125 which is standard practice in the aircraft industry.

In addition to the first and second latch mechanisms 128, 128', additional similar latch mechanisms could be utilized either in a separate location on the flex band 126 which has corresponding additional sets of opposed open ends in the flex band 126 thereby dividing the flex band 126 into separate sections. Or alternatively, the additional parallel latch mechanisms could be positioned on the flex band 126 to draw the first band end 135 towards the second band end 137 thereby providing additional redundancy to the first and second latch mechanisms 128, 128'.

The first latch mechanism 128 consists of a first draw spring 140 that is shown as being approximately rectangular in shape when viewed in a top plan view and has a radiused bend RR in two opposed spring leg sections 140A, 140B where the spring leg sections 140A, 140B are joined by spring end sections 140C, 140D which are hidden in FIG. 10 by a lever spring retainer 148 and by a first end clip 142 respectively.

In one exemplary approach, the first draw spring 140 has spring end sections 140C, 140D that are slightly wider than the spring end sections 140C', 140D' of a second draw spring 140' used in the second latch mechanism 128'. Note that spring end section 140C' is hidden from view in FIG. 10 by a second end clip 142'. The spring end section 140C is rotatably secured to the flex band 126 using the first end clip 142 where the first end clip 142 is secured to or formed as part of the flex band 126. A first latch lever 139 is rotatably mounted to the spring end section 140D by a lever spring retainer 148 where the first activation lever 139 has a finger tab 145 for the operator/installer to push or pull on to activate (latch) or de-activate (unlatch) the first latch mechanism 128. The first latch lever 139 includes a finger tab 145, a lever spring retainer 148 and a lever pivot 150 where the lever pivot 150 engages the second band retainer clip 144' when the first latch mechanism 128 is activated. To activate the first latch mechanism 128, the draw spring end section 140C is pushed towards the second band end 137 using the finger tab 145. After the lever pivot 150 engages the second band retainer clip 144', the operator forces the finger tab 145 towards the flex band 126 which causes the first latch lever 139 to go over center and to produce a tension on the first draw spring 140 and to be latched into position. This draw spring tension holds the first latch lever 139 in the activated position.

In an identical but opposite fashion to the operation of the first latch mechanism 128, the second latch mechanism 128' is used to provide a force on the first and second band ends 135, 137 to draw the first band end 135 towards the second band end 137. Thus, with the exception of the reduced width of the second draw spring 140', the second latch mechanism 128' is substantially identical in construction with the first latch mechanism 128. The second latch lever 139' is attached to the second band end 137 at the second end clip 142' by the second draw spring 140' and more specifically by draw spring end 140C' which is rotatably attached to the draw spring 140' at the lever spring retainer 148' and is thereby positioned facing the first latch mechanism 128. Thus, the first latch mechanism 128 is permanently attached proximate to the first band end 135 while the second latch mechanism 128' is permanently attached proximate to the second band end 137. When activated, both the first and second latch mechanisms 128, 128' act to draw the first band end 135 towards the second band end 137 thereby tightening the flex band 126 and securing the conduit connection (see FIG. 2).

The second latch mechanism 128' consists of a second draw spring 140' that is shown as being approximately rectangular in shape when viewed in a top plan view (for example, see FIG. 9) and has a bend with a slight radius RR' in the two opposed spring leg sections 140A', 140B' when viewed in a side plan view where the spring leg sections 140A', 140B' are joined by spring end sections 140C' and 140D'. In the preferred embodiment, the length of spring end sections 140C' and 140D' of the second draw spring 140' are slightly shorter than the spring end sections 140C and 140D of the first draw spring 140. This allows the first draw spring 140 to be positioned outside the second draw spring 140' when the first and second latch mechanisms 128, 128' are latched. The first draw spring 140 could be made slightly narrower than the second draw spring 140' and works equally as well. In addition, the alternate configurations of the first and second draw spring disclosed with reference to FIG. 1 could be utilized.

The second retainer plate 130' is attached proximate to the second band end 137 and includes both the second end clip 142' and the second band retainer clip 144'. The second retainer plate 130' can be separately formed and then attached to the flex band 126 or it can be formed integral with the flex band 126 or any portion of the second retainer plate 130' can be separately formed and then the remaining portion of the second retainer plate 130' can be formed integral with the flex band 126. Various materials can be used for the various components of the conduit clamping system 120. Some examples are steel, aluminum, cast iron, cast aluminum, spring steel, engineered plastic, composites and ceramics. Competing requirements including performance, cost and weight dictate what material is selected for each of the components including the first and second retainer plates 130, 130'

The second draw spring 140' is connected to both the flex band 126 and a second latch lever 139' by the spring end sections 140C' and 140D' respectively. The spring end section 140C' is rotatably secured to the flex band 126 using the second end clip 142' where the second end clip 142' is secured to or formed as part of the flex band 126. The second latch lever 139' is rotatably mounted to the spring end section 140D' where the second latch lever 139' has a finger tab 145' for the operator/installer to push or pull on to activate the second latch mechanism 128'. When the second latch mechanism 128' is activated, the draw spring end section 140D' and hence the lever spring retainer 148' is pushed towards the second band end 137 using the finger tab 145. The second latch lever 139' includes a finger tab 145', a lever spring retainer 148' and a lever pivot 150' where the lever pivot 150' engages the first band retainer clip 144 when the second latch mechanism 128' is activated. The operator forces the finger tab 145' towards the flex band 125 which causes the second latch lever 139' to go over center and to produce a tension on the second draw spring 140' and to be latched into position.

Figure 11:
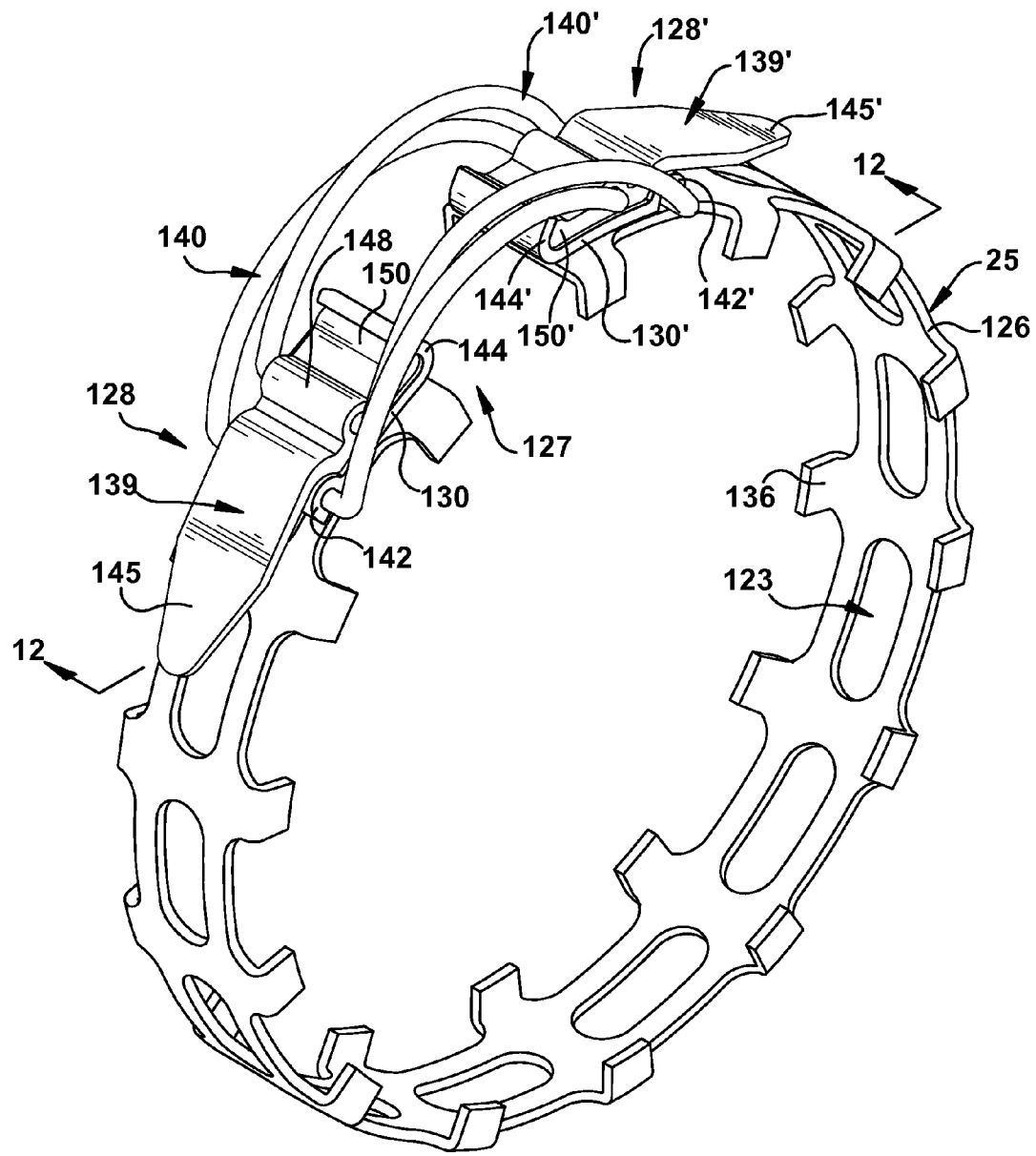
FIG. 11 is a perspective view of the alternative clamping system shown in a fully latched condition.

Now referring to FIG. 11 of the drawings, a partial perspective view of the conduit coupling system 120 is shown with both the first and second latch mechanisms 128, 128' being in a fully latched condition. Clearly shown is how the first draw spring 140 fits outside of the second draw spring 140'. The lever spring retainers 148, 148' are set back from the lever pivots 150, 150' respectively. The lever pivots 150, 150' engage the second and first band retainer clips 144', 144 respectively. As either the first or second latch mechanisms 128, 128' are closed, they move past a centered force position and the force of the first and second draw springs 140, 140' respectively pull the first and second latch mechanisms 128, 128' firmly closed against the flex band 126. This holds the first and second latch levers 139, 139' into a closed position until an operator pulls the lever fingers 145, 145' upward away from the flex band 126. The first latch lever 139 includes a finger tab 145, a lever spring retainer 148 and a lever pivot 150 where the lever pivot 150 engages the second band retainer clip 144' when the first latch mechanism is activated.

Likewise, the second latch lever 139' includes a finger tab 145', a lever spring retainer 148' and a lever pivot 150' where the lever pivot 150' engages the first band retainer clip 144 when the second latch mechanism 128' is activated.

Figure 12:
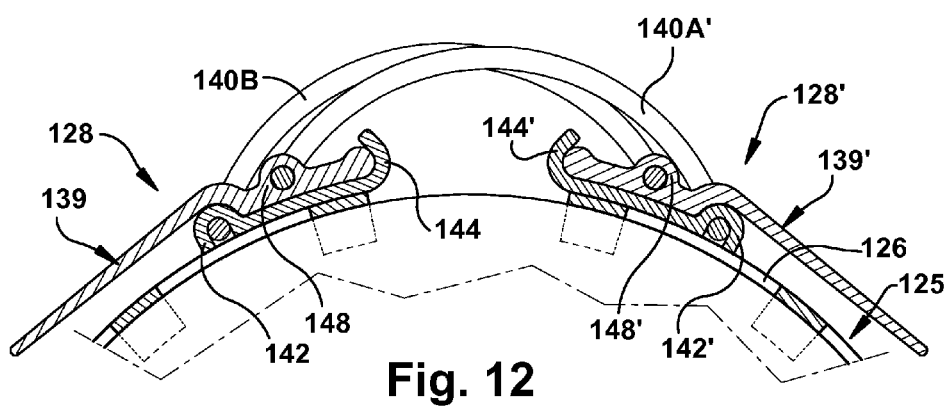
FIG. 12 is a sectional view of the alternative clamping system shown in FIG. 11 taken along line 12-12.

Now referring to FIG. 12 of the drawings, a cross-sectional view of the conduit clamping system 120 taken along line 12-12 of FIG. 11 is shown with both the first and second latch mechanisms 128, 128' being in a fully latched condition. The lever spring retainers 148, 148' are set back from the finger tabs 150, 150' respectively. This provides for assistance from the first and second draw springs 140, 140' in holding the first and second latch levers 139, 139' firmly in the closed, activated position against the flex band 126. Thus, the first and second latch levers 139, 139' are held closed by the force generated by the first and second draw springs 140, 140' respectively into a closed position until an operator pulls the lever fingers 145, 145' upward away from the flex band 126.

Figure 13:
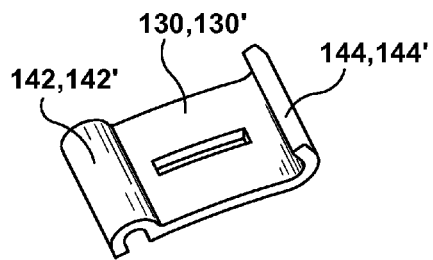
FIG. 13 is a perspective view of the retainer plates of the alternative clamping system.

Now referring to FIG. 13 of the drawings, a perspective view of one of the retainer plates 130, 130' is shown. The retainer plates 130, 130' can be integrally formed with the flex band 126 or they can be separately made and then attached to the flex band 126 using any one of a number of prior art fastening techniques. In one embodiment, the retainer plates 130, 130' are made of cast metal and then bonded or otherwise attached to the flex band 126. Other known materials may be used to form the retainer plates 130, 130' such as titanium or ceramics or composites for example. Also clearly shown are the first and second end clips 142, 142' and the first and second band retainer clips 144, 144'.

Figure 14:
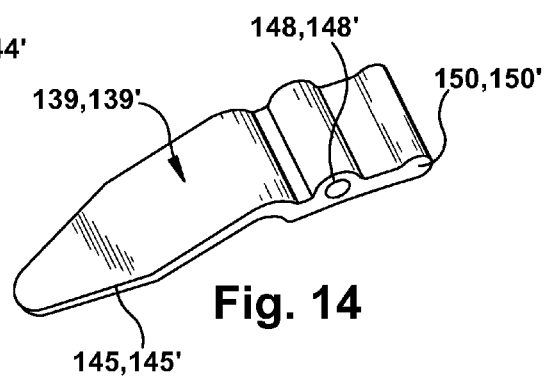
FIG. 14 is a perspective view of the latch lever of the alternative clamping system.

Now referring to FIG. 14 of the drawings, a perspective view of one of the latch levers 139, 139' is shown. Each of the first and second latch levers 139, 139' include a finger tab 145, 145', a lever spring retainer 148, 148' and a lever pivot 150, 150'. The lever can be cast of a metal material or molded from an engineered plastic or formed of other know materials such as titanium, ceramics or composites, for example.

Figure 15:
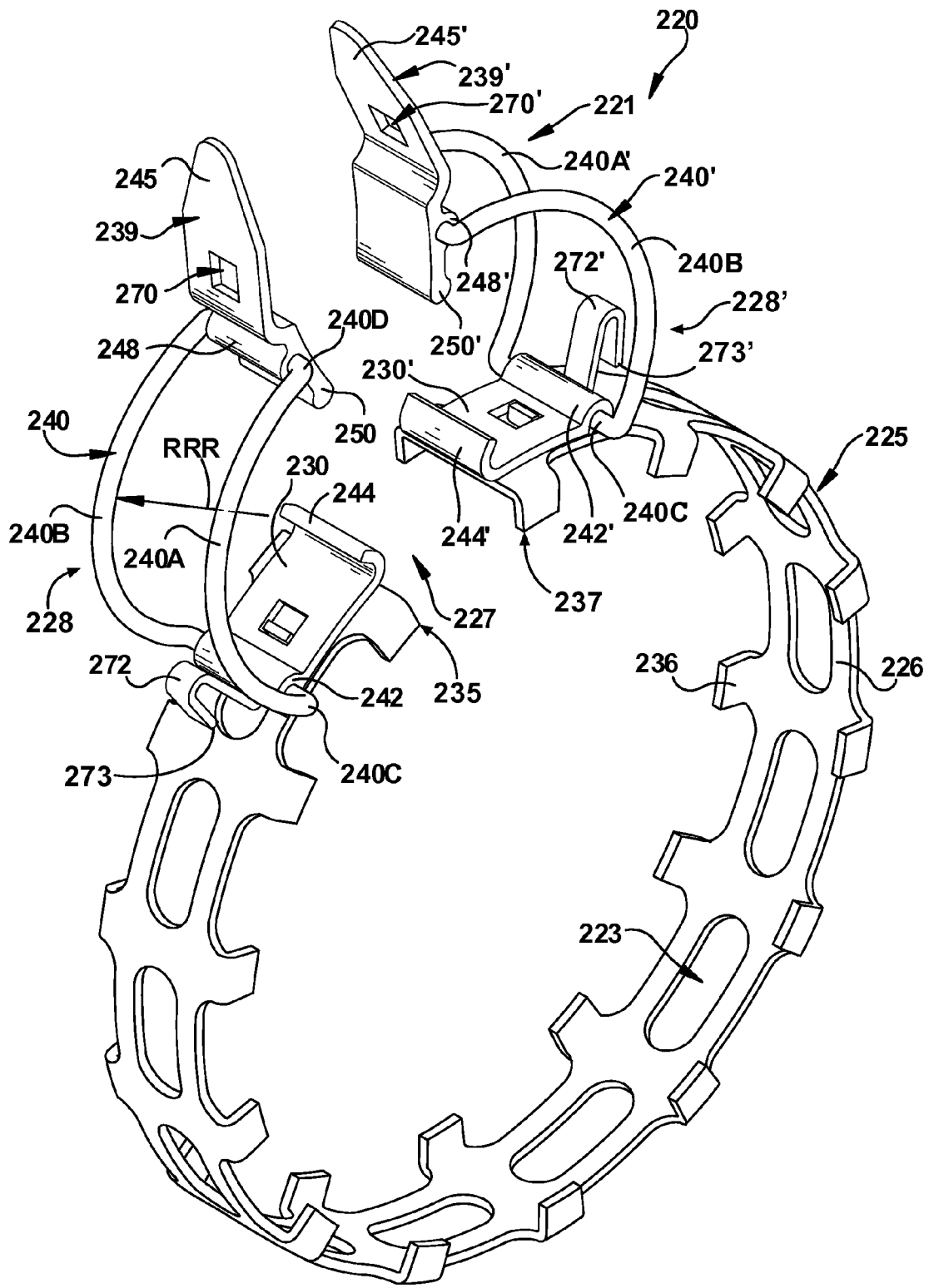
FIG. 15 is a perspective view of a second alternative clamping system shown in an unlatched condition.

Now referring again to the drawings and particularly to FIG. 15, a perspective view of a second alternative exemplary conduit clamping system 220 is shown in an unlatched condition which includes a flex band assembly 225 having a flex band 226 with a band end gap 227 which is drawn together by a latching mechanism 221. The conduit clamping assembly 220 provides a redundant latching function which includes the flex band assembly 225 drawn together by the latching mechanism 221. The latching mechanism 221 consists of at least two latch mechanisms shown as a first latch mechanism 228 and a corresponding opposed second latch mechanism 228'. Latch lock windows 270, 270' are formed in the first and second latch levers 239, 239' respectively and are dimensioned and positioned in the levers 239, 239' to engage the locking clips 272, 272' that extend from and are attached to the flex band 226. The locking clips are shaped so that once the levers 239, 239' are fully closed (activated) the free ends 273, 273' of the locking clips 272, 272' prevent the latch levers 239, 239' from moving away from the flex band 226 thereby providing for redundancy in the forces that hold the levers 239, 239' in the activated position against the flex band 226. The draw springs 240, 240' provide the primary forces that hold the latch levers 239, 239' in a closed position.

In the illustrative approach either the first latch mechanism 228 or the second latch mechanism 228' can provide the required retention clamping force on the flex band assembly 225 to retain, for instance, the sections of a fluid conduit such as fuel tubing sections. To provide the retention clamping force on the flex band assembly 225, both the first latch mechanism 228 and the second latch mechanism 228' may be used to provide for redundancy in the clamping force since either the first latching mechanism 228 or the second latching mechanism 228' can be configured to provide the required clamping force to retain for example, a first conduit 22 in contact with a second conduit 24 (see FIG. 2). Such redundancy provides for continuation of the flow of fluid through sections of a conduit even if one of the latch mechanisms 228, 228' fails or is not latched properly. Another redundancy in the function of the clamping assembly 220 is provided by using both the forces generated by the draw springs 240, 240' and the locking clips 272, 272' to hold the latch levers 239, 239' closed.

Thus, the flex band assembly 225 has the first band end 235 that is drawn towards the second band end 237 when either the first or the second latching mechanisms 228, 228' are activated. This draws the flex band assembly 225 around a conduit or tubing connection section (see FIG. 2). A plurality of flex band tabs 236 extend inwardly from both edges of the flex band 226 and extend at an angle from the flex band 226 so as to position the flex band 226 on the connection section at the interface between two conduits. The flex band 226 is made of a flexible material such as steel or a like material that can be opened up by spreading its first band end 235 from its second band end 237 to allow the flex band assembly 225 to be assembled or removed from a conduit interface connection such as that shown in FIG. 2.

The first retainer plate 230 is attached proximate to the first band end 235 and includes both the first end clip 242 and the first band retainer clip 244. The first retainer plate 230 can be separately formed and then attached to the flex band 226 or it can be formed integral with the flex band 226 or any portion of the first retainer plate 230 can be separately formed and then the remaining portion of the first retainer plate 230 can be formed integral with the flex band 226. Various materials can be used for the various components of the conduit clamping system 220 including the first retainer plate 230. Some examples are steel, aluminum, cast iron, cast aluminum, spring steel, engineered plastic, composites and ceramics.

The second retainer plate 230' is attached proximate to the second band end 237 and includes both the second end clip 242' and the second band retainer clip 244'. The second retainer plate 230' can be separately formed and then attached to the flex band 226 or it can be formed integral with the flex band 226 or any portion of the second retainer plate 230' can be separately formed and then the remaining portion of the second retainer plate 230' can be formed integral with the flex band 226. In the flex band 226, at least one slot 223 can be formed therein to provide for a decrease in overall weight of the flex band assembly 225 which is standard practice in the aircraft industry.

In addition to the first and second latch mechanisms 228, 228', additional similar latch mechanisms could be utilized either in a separate location on the flex band 226 which has corresponding additional sets of opposed open ends in the flex band 226 thereby dividing the flex band 226 into separate sections. Or alternatively, the additional parallel latch mechanisms could be positioned on the flex band 226 to draw the first band end 235 towards the second band end 237 thereby providing additional redundancy to the first and second latch mechanisms 228, 228'.

The first latch mechanism 228 consists of a first draw spring 240 that is shown as being approximately rectangular in shape when viewed in a top plan view and has a radiused bend RRR in two opposed spring leg sections 240A, 240B where the spring leg sections 240A, 240B are joined by spring end sections 240C, 240D which are hidden in FIG. 15 by a lever spring retainer 248 and by a first end clip 242 respectively.

In one exemplary approach, the first draw spring 240 has spring end sections 240C, 240D that are slightly shorter than the spring end sections 240C', 240D' of a second draw spring 240' used in the second latch mechanism 228'. Note that spring end section 240C' is hidden from view in FIG. 15 by a second end clip 242'.

The spring end section 240C is rotatably secured to the flex band 226 using the first end clip 242 where the first end clip 242 is secured to or formed as part of the flex band 226. A first latch lever 239 is rotatably mounted to the spring end section 240D by a lever spring retainer 248 where the first activation lever 239 has a finger tab 245 for the operator/installer to push or pull on to activate (latch) or de-activate (unlatch) the first latch mechanism 228. The first latch lever 239 includes a finger tab 245, a lever spring retainer 248 and a lever pivot 250 where the lever pivot 250 engages the second band retainer clip 244' when the first latch mechanism 228 is activated. To activate the first latch mechanism 228, the draw spring end section 240C contained within the lever spring retainer 248 is pushed towards the second band end 237 using the finger tab 245. The operator then forces the finger tab 245 towards the flex band 226 which causes the first latch lever 239 to go over center and to produce a tension on the first draw spring 240 and the first latch lever 239 is latched into position. This draw spring force holds the first latch lever 239 in the activated position. As the first latch lever 239 approaches the flex band 226, the locking clip 272' is compressed and passes through the latch lock window 270 formed in the first latch lever 239. When the first latch lever 239 is moved into the latched position and the latch mechanism 228 is fully activated, the free end 273' of the locking clip 272' expands and interferes with any attempted opening of the first latch lever 239.

In an identical but opposite fashion to the operation of the first latch mechanism 228, the second latch mechanism 228' is used to provide a force on the first and second band ends 235, 237 to draw the first band end 235 towards the second band end 237. Thus, with the exception of the width of the second draw spring 240', the second latch mechanism 228' is substantially identical in construction with the first latch mechanism 228 but the second latch lever 239' is attached to the second band end 237 at the second end clip 242' by the second draw spring 240' and more specifically by draw spring end 240C' and is thereby positioned facing the first latch mechanism 228. Thus, the first latch mechanism 228 is permanently attached proximate to the first band end 235 while the second latch mechanism 228' is permanently attached proximate to the second band end 237. When activated, both the first and second latch mechanisms 228, 228' act to draw the first band end 235 towards the second band end 237 thereby tightening the flex band 226 and securing the conduit connection (see FIG. 2). The latch lock windows 270, 270' formed in the first and second latch levers 239, 239' and are dimensioned and positioned in the levers 239, 239' to engage the locking clips 272, 272' that extend from and are attached to the flex band 226. The locking clips are shaped so that once the levers 239, 239' are fully closed (activated) the free ends 273, 273' of the locking clips 272, 272' prevent the levers 239, 239' from moving away from the flex band 226 thereby providing for redundancy in the forces that hold the levers 239, 239' in the activated position against the flex band 226.

The second latch mechanism 228' consists of a second draw spring 240' that is shown as being approximately rectangular in shape when viewed in a top plan view and has a bend with a slight radius RRR' in the two opposed spring leg sections 240A', 240B' when viewed in a side plan view where the spring leg sections 240A', 240B' are joined by spring end sections 240C' and 240D'. In the preferred embodiment, the length of spring end sections 240C' and 240D' of the second draw spring 240' are slightly longer than the spring end sections 240C and 240D of the first draw spring 240. This allows the first draw spring 240 to be positioned inside the second draw spring 240' when the first and second latch mechanisms 228, 228' are latched. In a second embodiment, the second draw spring 240', spring end section 240C' is slightly wider than opposite spring end section 240D'. Alternately, the first and second spring end sections 240C and 240D respectively, could be the same width but are allowed to flex outward when the latch mechanisms 228, 228' are latched.

The second retainer plate 230' is attached proximate to the second band end 237 and includes both the second end clip 242' and the second band retainer clip 244'. The second retainer plate 230' can be separately formed and then attached to the flex band 226 or it can be formed integral with the flex band 226 or any portion of the second retainer plate 230' can be separately formed and then the remaining portion of the second retainer plate 230' can be formed integral with the flex band 226.

The second draw spring 240' is connected to both the flex band 226 and a second latch lever 239' by the spring end sections 240C' and 240D' respectively. The spring end section 240C' is rotatably secured to the flex band 226 using the second end clip 242' where the second end clip 242' is secured to or formed as part of the flex band 226. The second latch lever 239' is rotatably mounted to the spring end section 240D' where the second latch lever 239' has a finger tab 245' for the operator/installer to push or pull on to activate the second latch mechanism 228'. When the second latch mechanism 228' is activated, the draw spring end section 240D' along with the lever spring retainer 248' is pushed towards the second band end 237 using the finger tab 245. The second latch lever 239' includes a finger tab 245', a lever spring retainer 248' and a lever pivot 250' where the lever pivot 250' engages the first band retainer clip 244 when the second latch mechanism 228' is activated. The operator forces the finger tab 245 towards the flex band 226 which causes the second latch lever 239' to go over center and to produce a tension on the second draw spring 240' and to be latched into position.

Figure 16:
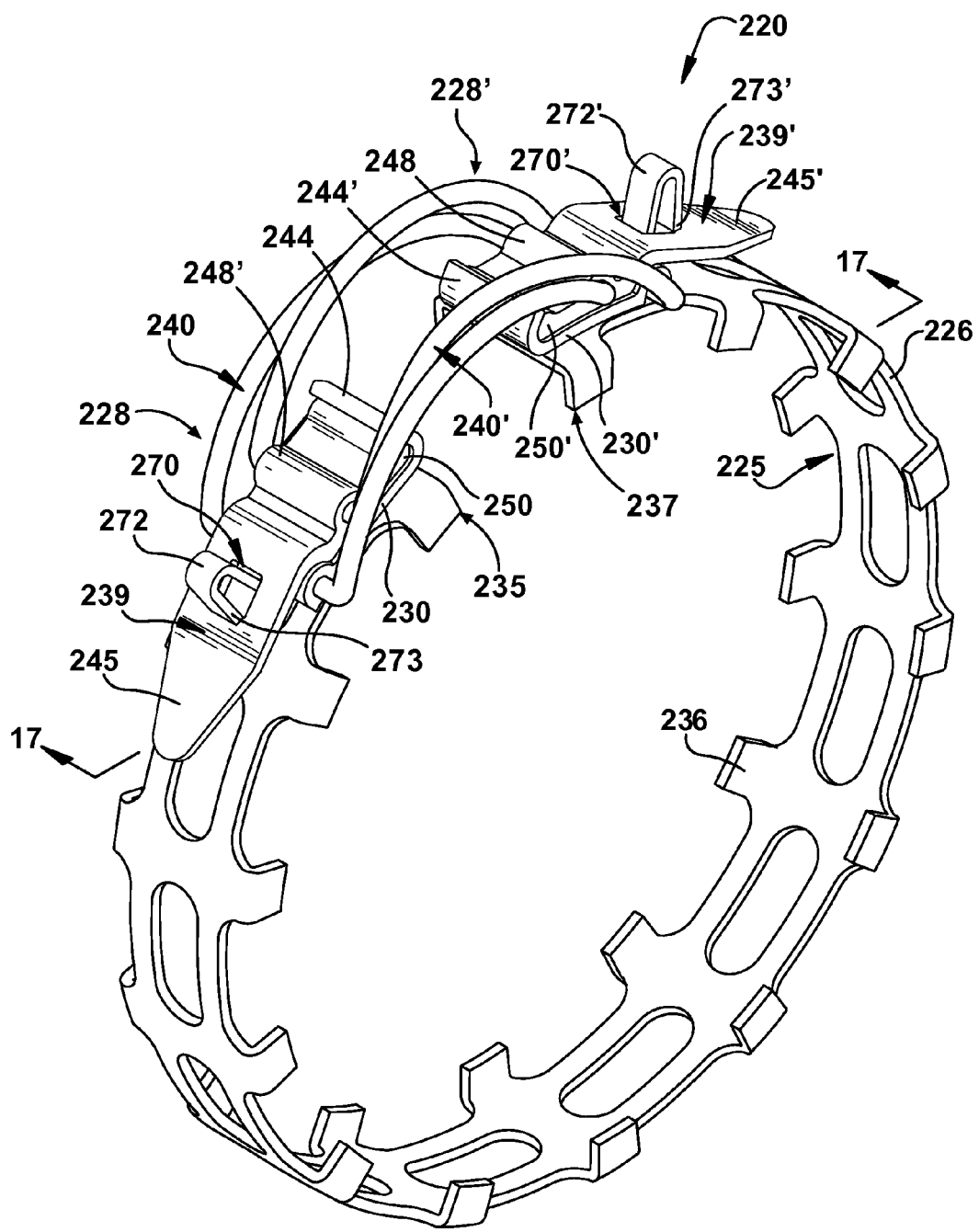
FIG. 16 is a perspective view of the second alternative clamping system shown in a fully latched condition.

Now referring to FIG. 16 of the drawings, a partial perspective view of the conduit coupling system 220 is shown with both the first and second latch mechanisms 228, 228' being in a fully latched condition. Clearly shown is how the first draw spring 240 fits inside of the second draw spring 240' and how the lever spring retainers 248, 248' are set back from the lever pivots 250, 250' respectively. The first latch lever 239 includes a finger tab 245, a lever spring retainer 248 and a lever pivot 250 where the lever pivot 250 engages the second band retainer clip 244' when the first latch mechanism is activated. Likewise, the second latch lever 239' includes a finger tab 245', a lever spring retainer 248' and a lever pivot 250' where the lever pivot 250' engages the first band retainer clip 244 when the second latch mechanism 228' is activated. The lever pivots 250, 250' engage the second and first band retainer clips 244', 244 respectively. As either the first or second latch mechanisms 228, 228' are closed, they move past a centered force position and the force of the first and second draw springs 240, 240' respectively pull the first and second latch mechanisms 228, 228' firmly closed against the flex band 226. This holds the first and second latch levers 239, 239' into a closed position until an operator pulls the lever fingers 245, 245' upward away from the flex band 226. However, it is a feature of the clamping system 220 that the first or second latch levers 239, 239' cannot be moved into the unlatched position until each of their respective locking clips 272, 272' are compressed to allow the free ends 273, 273' to pass through their respective latch lock windows 270, 270'.

Figure 17:
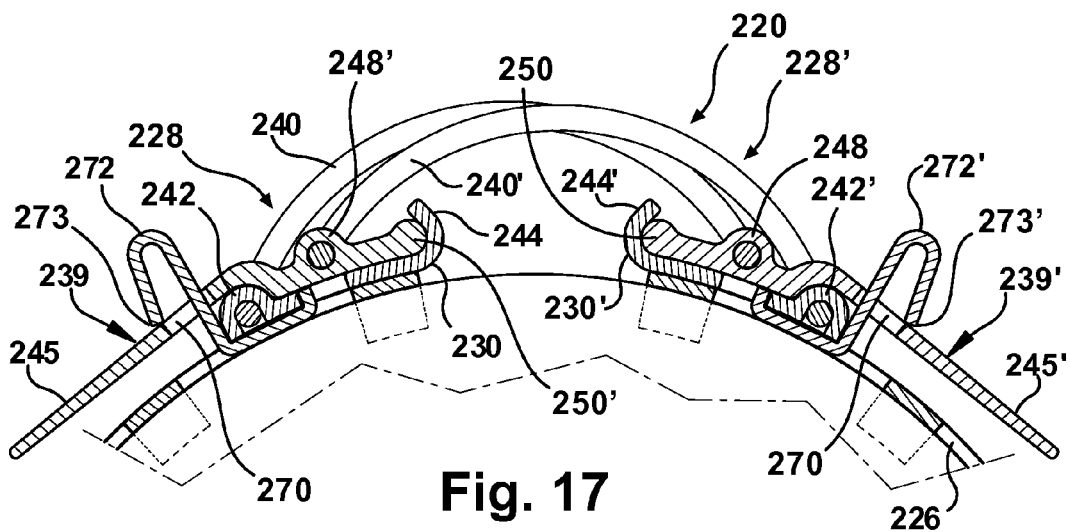
FIG. 17 is a sectional view of the second alternative clamping system shown in FIG. 16 taken along line 17-17.

Now referring to FIG. 17 of the drawings, a cross-sectional view of the conduit clamping system 220 taken along line 17-17 of FIG. 16 is shown with both the first and second latch mechanisms 228, 228' being in a fully latched condition. The lever spring retainers 248, 248' are set back from the finger tabs 250, 250' respectively which provides for assistance from the first and second draw springs 240, 240' in holding the first and second latch levers 239, 239' firmly in the closed, activated position against the flex band 226. Latch lock windows 270, 270' are formed in the first and second latch levers 239, 239' respectively and are dimensioned and positioned in the levers 239, 239' to engage the locking clips 272, 272' that extend from and are attached to the flex band 226. The locking clips are shaped so that once the levers 239, 239' are fully closed (activated) the free ends 273, 273' of the locking clips 272, 272' prevent the levers 239, 239' from moving away from the flex band 226 thereby providing for redundancy in the forces that hold the levers 239, 239' in the activated position against the flex band 226.

Thus, the first and second latch levers 239, 239' are held closed both by the force generated by the first and second draw springs 240, 240' respectively into a closed position until an operator pulls the lever fingers 245, 245' upward away from the flex band 226. However it is a feature of the clamping system 220 that the latch levers 239, 239' cannot be moved into their unlatched position until the locking clips 272, 272' are compressed so that their free ends 273, 273' can pass through their respective latch lock windows 270, 270'.

Figure 18:
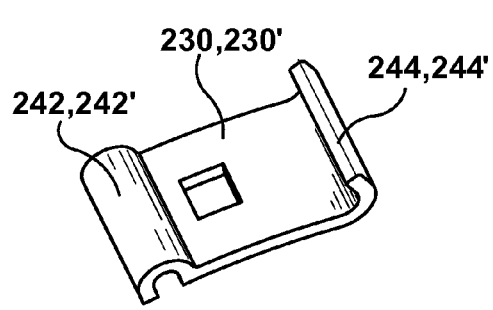
FIG. 18 is a perspective view of the retainer plate of the second alternative clamping system.

Now referring to FIG. 18 of the drawings, a perspective view of one of the retainer plates 230, 230' is shown. The retainer plates 230, 230' can be integrally formed with the flex band 226 or they can be separately made and then attached to the flex band 226 using any one of a number of prior art fastening techniques such as welding. In one embodiment, the retainer plates 230, 230' are made of cast metal and then bonded or otherwise attached to the flex band 226. Other known materials may be used to form the retainer plates 230, 230' such as titanium or ceramics or composites for example. Also clearly shown are the end clips 242, 242' and the band retainer clips 244, 244'.

Figure 19:
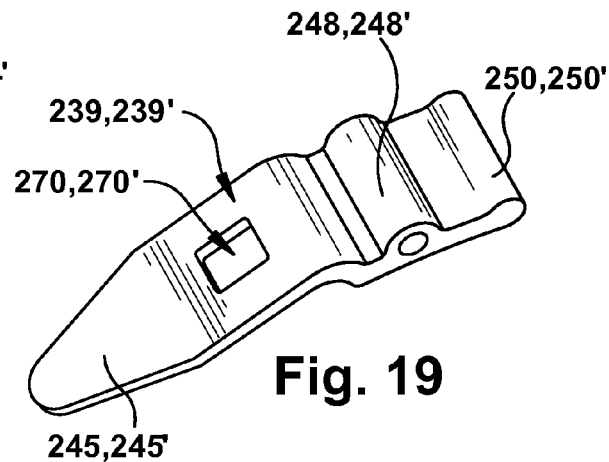
FIG. 19 is a perspective view of the latch lever of the second alternative clamping system.

Now referring to FIG. 19 of the drawings, a perspective view of one of the latch levers 239, 239' is shown. Each of the first and second latch levers 239, 239' include a finger tab 250, 250', a lever spring retainer 248, 248' and a lever pivot 250, 250'. The lever can be cast of a metal material or molded from an engineered plastic or formed of other know materials such as titanium, ceramics or composites for example. Latch lock windows 270, 270' are formed in the first and second latch levers 239, 239' and are dimensioned and positioned in the levers 239, 239' to engage the locking clips 272, 272' that extend from and are attached to the flex band 226. The locking clips are shaped so that once the levers 239, 239' are fully closed (activated) the free ends 273, 273' of the locking clips 272, 272' prevent the levers 239, 239' from moving away from the flex band 226 thereby providing for redundancy in the forces that hold the levers 239, 239' in the activated position against the flex band 226.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. A fluid conduit clamping system comprising,
a flex band having a first band end and a second band end and a first band retainer clip attached proximate to said first band end and a second band retainer clip attached proximate to said second band end;
a first latch mechanism having a first draw spring with a spring end section rotatably attached to said first band end and having a first latch lever rotatably attached to said first draw spring at an opposite spring end section;
a second latch mechanism having a second draw spring with a spring end section rotatably attached to said second band end and having a second latch lever rotatably attached to said second draw spring at an opposite spring end section;
where said first latch lever engages said second band retainer clip and said second latch lever engages said first band retainer clip when the conduit latch assembly is activated.

2. The conduit clamping system of claim 1 wherein said first latch lever and said second latch lever have respective finger tab sections extending therefrom for latching and unlatching.

3. The conduit clamping system of claim 1 wherein said flex band further includes end clips and said first latch lever and said second latch levers have respective lever retainer clips extending therefrom for frictionally engaging respective end clips.

4. The conduit clamping system of claim 1 wherein said flex band further includes band retainer clips each having at least one clip slot and said first and second latch levers have respective latch hook tabs extending therefrom for engaging respective clip slots.

5. The conduit clamping system of claim 3 wherein each of said end clips and each of said band retainer clips are formed as a one piece assembly, said assembly being attached to said flex band.

6. The conduit clamping system of claim 1 wherein the first and second latch levers have a finger tab joined to a lever spring retainer which is joined to a lever pivot, said lever pivot engaging said band retainer clip when the conduit latch assembly is activated.

7. The conduit clamping system of claim 1 wherein said first draw spring passes inside or outside of said second draw spring when said first and second latch mechanisms are activated.

8. The conduit clamping system of claim 1 wherein said first and second latch levers are made of a cast metal material.

9. A fluid conduit clamping system comprising:
a flex band assembly including a flex band having a first band end and a second band end where a first band retainer clip is attached to said flex band proximate said first band end and a second band retainer clip is attached to said flex band proximate said second band end and a first end clip attached to said flex band proximate said first band end and a second end clip attached to said flex band proximate said second band end, said flex band having a plurality of tabs extending inwardly therefrom;
a latching system for drawing said first band end towards said second band end having a first latch mechanism including a first draw spring, said first draw spring having a spring end section rotatably attached to said first end clip and a opposite spring end section rotatably attached to a first latch lever and having a second latch mechanism including a second draw spring, said second draw spring having a spring end section rotatably attached to said second end clip and an opposite spring end section rotatably attached to a second latch lever.

10. The conduit clamping system of claim 9, wherein said first latch lever has a finger tab which extends from one end and a latch hook tab extending from an opposite end.

11. The conduit clamping system of claim 9, wherein said second latch lever has a finger tab which extends from one end and a latch hook tab extending from an opposite end.

12. The conduit clamping system of claim 9, wherein said first and second latch levers have lever retainer clips formed thereon, said lever retainer clips frictionally engaging said end clips when said first and second latch mechanisms are activated.

13. The conduit clamping system of claim 9, wherein said first and second latch levers have finger tabs formed thereon.

14. The conduit lamping system of claim 13 wherein said first and second latch levers have lever spring retainers connected to said finger tabs.

15. The conduit clamping system of claim 14 wherein said lever spring retainers are connected to lever pivots.

16. The conduit clamping system of claim 9, wherein said first and second latch levers have latch hook tabs extending therefrom and where said retainer clips have clip slots formed therein for receiving said latch hook tabs.

17. The conduit clamping system of claim 9, wherein the width of said first draw spring is different than the width of said second draw spring sufficient for said first draw spring to pass over or under said second draw spring.

18. The conduit clamping system of claim 9 wherein said first and second latch levers have latch lock windows formed therein to engage respective locking clips which extend from and are attached to said flex band.

\* \* \* \* \*